United States Patent [19]

Hartmann et al.

[11] 4,365,387
[45] Dec. 28, 1982

[54] METHOD AND APPARATUS FOR FILLETING FISH

[75] Inventors: Franz Hartmann, Bad Oldesloe; Manfred Krohn, Bad Schwartau, both of Fed. Rep. of Germany

[73] Assignee: Nordischer Machinenbau Rud. Baader, Lubeck, Fed. Rep. of Germany

[21] Appl. No.: 219,947

[22] Filed: Dec. 24, 1980

[51] Int. Cl.³ ............................................. A22C 25/16
[52] U.S. Cl. .............................................. 17/52; 17/56
[58] Field of Search .......................... 17/52, 46, 56, 57

[56] References Cited

U.S. PATENT DOCUMENTS

| | | | |
|---|---|---|---|
| 2,832,988 | 5/1958 | Schlichting | 17/52 |
| 3,315,299 | 4/1967 | Danielsson | 17/56 X |
| 3,955,242 | 5/1976 | Hartmann | 17/57 |
| 4,008,509 | 2/1977 | Braeger et al. | 17/56 |

*Primary Examiner*—Willie G. Abercrombie
*Attorney, Agent, or Firm*—Edward F. Levy

[57] ABSTRACT

There is disclosed a mechanical fish filleting process, whose use with decapitated fish, particularly, those of approximately circular cross section, enables a substantial reduction in the manual trimming which is caused by falsely positioned cuts. A sequence of cuts is proposed which permits a more exact guiding and thus also alignment of the fish. The method comprises the following cut sequence: belly filleting cut, rib cut, severing cut to separate the lateral vertebral appendages and/or ribs from the back bone, back filleting cut guided from the belly to the vicinity of the fin holders of the dorsal fins, pinbone cut and back severing cut on both sides of the dorsal fins. The dorsal fins are so guided that they are reliably introduced between the back severing knives so that the fillets can be cut free from the fins or their remains.

7 Claims, 8 Drawing Figures

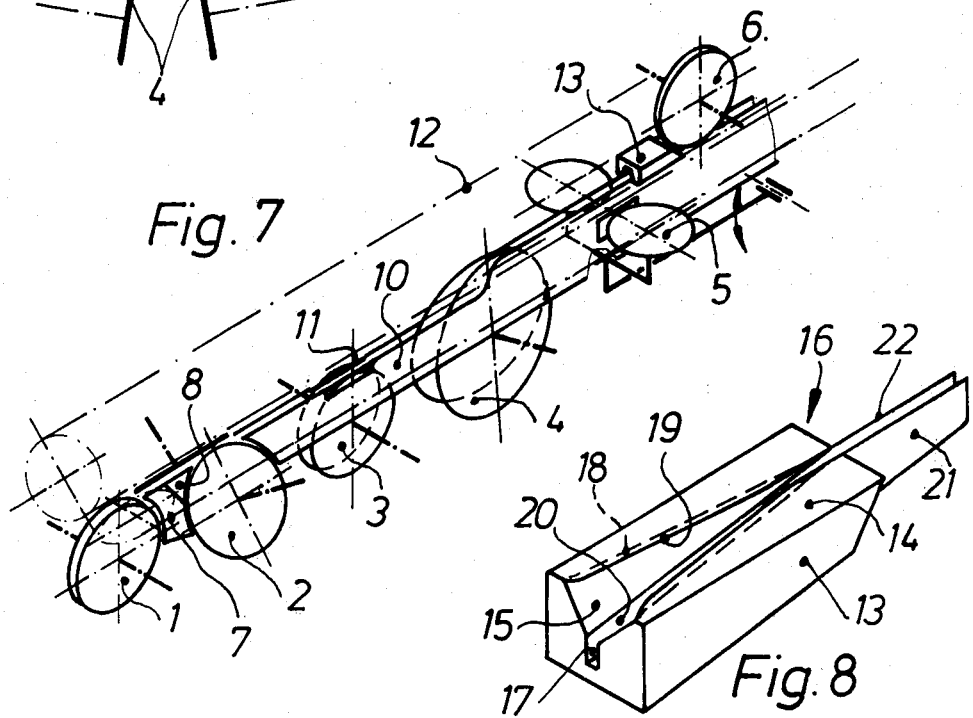

4,365,387

METHOD AND APPARATUS FOR FILLETING FISH

BACKGROUND OF THE INVENTION

1. Field of the Invention

The invention relates to a method of filleting decapitated fish and an apparatus for carrying out the method.

2. Description of the Prior Art

When judging the level of efficiency of a mechanised filleting method and the quality of the produce not only is the yield achieved of critical importance but also to what extent additional personnel are required manually to correct incorrect cuts by so-called trimming. This additional work has an effect which should not be underestimated, particularly when processing smaller bulk fish which for reasons of economy are filleted at a high rate. With this type of fish it is primarily those types whose cross-sectional shape approaches the circular for which this goal is particularly difficult to achieve since their precise alignment and guiding whilst being processed, which is a prerequisite for a satisfactory result, is particularly difficult due to the fact that there are no geometrical engagement points. This difficulty leads to a relatively high proportion of fillets which need to be trimmed and in particular dorsal fins or remnants of the back which remain on the fins render this manual working step necessary. This comprises removing these portions which, depending on the desired end product, hinder the further mechanical processing.

3. Object of the Invention

It is an object of the invention to provide a filleting method whose filleting cut sequence specially aims at the fish being optimally guided in the individual phases of the filleting process with the result that the requirement of trimming is substantially reduced.

SUMMARY OF THE INVENTION

In accordance with the present invention there is provided a method of filleting a decapitated fish which includes the cut sequence of opening the belly cavity and cutting free the belly spokes substantially up to the backbone by means of belly filleting cuts; cutting free the bones projecting laterally from the backbone on the side remote from the belly substantially up to the backbone by means of rib cuts; severing a bone strip containing the bones projecting laterally from said backbone by cutting through said bones on both sides of, and in the vicinity of, the backbone as far as the rib cuts; cutting free the back spokes to a point adjacent to the fin holders of the dorsal fins by means of back filleting cuts performed from the belly side of the fish; and separating the fillets from the bone structure by means of severing cuts performed from the back of the fish on both sides of the dorsal fins as far back as the filleting cuts.

The invention also embraces an apparatus for carrying out the method. It will be appreciated that the bones projecting laterally from the backbone are constituted by the vertebral appendages or projections and/or by the ribs of the fish.

The advantages of the method of fillleting in accordance with the present invention reside in particular in that during the entire process the fish is held in a form stability which on the one hand permits an optimal reactive force at each cut to the forces which occur and on the other hand permits a guiding of the cuts which in conjunction with guides using the state of cutting reached at any particular stage brings about in a certain manner a self-centering action. With this sequence of cuts there is achieved, in particular, an exact guiding of the dorsal fins since there is the possibility of guiding their fin holders by inner guides practically directly. Preferably the back and belly filleting cuts as well as the severing cuts are performed in pairs, which is a normal way of processing due to the essentially symmetrical structure of fish.

Pinbone cuts cutting away the belly flaps together with the pinbones can advantageously be integrated into this sequence of cuts, and these can be effected particularly exactly directly before the last cuts freeing the fillets from the bone structure since the bone strips containing the ribs and the vertebral appendages have already been removed so that an unimpeded alignment of the belly flaps and thus also of the pinbones is made possible in a simple manner.

The apparatus particularly suitable for carrying out the method in accordance with the invention comprises at least one pair each of belly filleting knives, rib knives, bone severing knives, wedge-cut back filleting knives and back parting or severing knives, respectively, a pair of conveyors for conveying or transferring the fish along a working path by engaging them by their flanks, and a line of guide elements situated above the path of the fish and being provided with a groove extending along their undersides, this apparatus being characterized amongst other things by the fact that at least that guide element which is situated directly upstream of the pair of back severing knives is provided on its side which comes into contact with the fish with a roof-shaped recess which opens out at the end directed towards the working tool, which recess communicates at its base with the longitudinally extending groove and the edges of which defining the broadest cross-sectional portion are provided with a rim which extends into the recess. In addition this guide element can be provided with two tongues arranged as an extension of the parallel flanks of the groove and extending up between the knives of the processing tool whose edges directed towards the fish extend approximately as an extension of the edges.

Thus it is possible securely to guide the dorsal fins between the parting knives which conclude the filleting process even if the dorsal fins are of soft consistency and stick to the body of the fish.

BRIEF DESCRIPTION OF THE DRAWINGS

Other and further objects of the present invention will be apparent from the following description and claims and are illustrated in the accompanying schematic drawings, which, by way of illustration, show preferred embodiments of the present invention and the principles thereof and what now are considered to be the best modes contemplated for applying these principles. Other embodiments of the invention embodying the same or equivalent principles may be used and structural changes may be made as desired by those skilled in the art without departing from the present invention and the scope of the appended claims.

In the drawings

FIG. 1 is a transverse sectional view through the tail portion of a fish in the region of the belly filleting tool;

FIG. 2 is a transverse sectional view through the belly cavity portion of the fish in the region of the rib cut tool with the belly flaps spread apart;

FIG. 3 is a transverse sectional view through the belly cavity portion of the fish in the region of the severing tool for the lateral vertebral appendages;

FIG. 4 is a transverse sectional view through the belly cavity portion of the fish in the region of the wedge-cut back filleting tool;

FIG. 5 is a transverse sectional view through the belly cavity portion of the fish in the region of the pinbone cutter;

FIG. 6 is a transverse sectional view through the fish in the region of the back parting tool;

FIG. 7 is a schematic perspective view of the whole filleting apparatus with the back guides merely indicated with dotted lines, and FIG. 8 is a perspective view of the last back guide element seen from the side directed towards the fish.

DETAILED DESCRIPTION OF THE PREFERRED EMBODIMENT

A fish filleting machine incorporating the gist of the invention comprises a machine frame, not shown, to which are secured in order one behind the other, pairs of belly filleting knives 1 driven in a suitable manner; of rib knives 2 inclined to one another; of severing or parting knives 3 for cutting away the lateral projections or appendages with the ribs; of back filleting knives 4 extending upwardly from down below in a wedge-like configuration; of opposing controlled pinbone knives 5 lying in a common plane on both sides of the fish pathway; and of back parting or severing knives 6 for cutting out the dorsal fin borders and freeing the fillets from the bone structure. Between the belly filleting knives 1 and the rib knives 2 there is situated a pair of guides 7 shaped in the manner of a plough which guide the cut-free belly portions of the fish into the plane of the rib knives 2. The part of them directed towards the latter is constructed in a known manner as a pivotable cutting support 8 which is controlled in dependence on the direction of movement of the fish on arrival of the end of the belly cavity of the fish into its position in which it covers or leaves exposed the cutting edge of the rib knives 2. The rib knives 2 are followed by a pair of guides 10 extending to beyond the parting knives 6, which guides 10 are cut away, at 11, in the vicinity of the severing knives 3 for the passage of their cutting edges, whose guide edges are stepped in the vicinity of the back filleting knives 4 and which are provided with apertures in the vicinity of the pinbone knives 5 to allow free access of the cutting edges. The transfer of fish is effected by means of a pair of conveyor belts 12 provided with spikes which engage their flanks. Above the fish pathway there is a series of vertically yieldable guide elements which are connectable to one another without any gap and of which only the last one is indicated schematically at 13. These guide elements have a longitudinally extending generally roof-shaped recess on their undersides, the base of which goes over into a groove affording space for the dorsal fins of the fish. The last guide element 13 is shown in more detail in FIG. 8. Its underside 14, which, for the sake of better understanding, is illustrated in an upwardly directed position, has a roof-shaped recess 15 which terminates at an end 16 directed towards the back parting knives 6 and whose base affords a groove 17. Edges 18 which define the broadest portion in cross-section of the recess 15 are each provided with a rim 19 extending into the recess 15. Flanks 20 of the groove 17 are extended out beyond the end 16 of the guide element 13 by thin tongues 21, preferably manufactured from spring hard steel, which define a gap between them corresponding to the breadth of the groove 17 and whose edges 22 directed towards the fish extend in the plane of the edges 18. In the operative position the tongues 21 project between the back parting knives 6.

The operation of the apparatus is as follows. A decapitated but not necessarily slaughtered resp. gutted fish is presented aligned to the filleting machine with its belly downwards and e.g. with its headed surface forwards and its conveying is taken over by the conveyor belts 12 of the conveyor. After carrying out the belly filleting cuts by means of the belly filleting knives 1 which open the belly cavity and cut free the belly spoke bones 24, the cut-free bellyside fillet portions and the belly flaps 31 which are still connected to the ribs 29 are spread out by means of the guides 7 into the plane of the rib knives 2. Before arrival of the fish at the rib knives 2 the cutting supports 8 are moved out whilst clearing the cutting edges of the rib knives 2 so that the cutting free of the lateral vertebral appendages 28 and/or the ribs 29 then occurs. This rib cut is terminated at the end of the belly cavity by moving the cut support 8 back into a position covering the rib knives 2 whilst utilizing a suitable measuring or controlling signal. The fish is then, whilst riding on the guides 10, fed to the severing knives 3 which, as shown in FIG. 3, sever the lateral vertebral appendages 28 and/or the ribs 29 directly next to the backbone 23 and remove the bone strips containing these skeleton portions from the fish which is conveyed further. The succeeding back filleting knives 4 are, as shown in FIG. 4, disposed with respect to one another to define a general wedge shape and cut into the fish on both sides of the backbone 23 up to the vicinity of the fin supports or holders 27 thus cutting free the back spoke bones 25 so that the fillets 32 hang together merely at the dorsal fin border. The guides 10 which rise up behind the back filleting knives 4 to the height of the cutting edges of the latter extend into these cuts. The belly flaps 31 above the pinbones 30 can be cut away extremely advantageously by pinbone knives 5 after this cut due to the precise guiding which occurs at this point and this tool is moved out in a curve in a known manner at the end of the belly cavity. The back parting knives 6 conclude the filleting process which effects the cutting free of the bone structure by separating cuts guided on both sides of the dorsal fins 26. The final guide element 13 of the chain back guide elements which is mounted immediately upstream of the back parting knives 6 is so formed on its lower surface directed towards the fish that the dorsal fins 26 are guided between the back parting knives 6.

What we claim as our invention and seek to secure by Letters Patent is:

1. A method of filleting a decapitated fish of substantially circular cross-section, said fish having at least a back, a belly including belly flaps essentially defining a belly cavity, a backbone, lateral vertebral appendages projecting from said backbone, belly spokes, back spokes, and dorsal fins having fin holders, said method including the following steps:
   (a) transporting said fish belly side down and head end leading along a pathway in a conveying direction, with the fish engaged by its flanks;
   (b) opening said belly cavity and cutting free said belly spokes substantially up to said backbone by means of belly filleting cuts;

(c) cutting free said lateral vertebral appendages projecting from said backbone on the side remote from said belly substantially up to said backbone by means of rib cuts;
(d) severing a bone strip containing said lateral vertebral appendages by cutting through said bones on both sides of, and in the vicinity of, said backbone substantially as far as said rib cuts;
(e) cutting free said back spokes to a point adjacent to said fin holders of said dorsal fins by means of back filleting cuts performed from the belly side of said fish; and
(f) separating the fillets from the bone structure by means of severing cuts from said back of said fish on both sides of said dorsal fins as far as said back filleting cuts.

2. A method as claimed in claim 1, said fish further having pinbones extending laterally from said lateral vertebral appendages extending from said backbone, wherein directly before separating said fillets from said backbone said belly flaps together with said pinbones are cut away from said fish by means of pinbone cuts.

3. Apparatus for filleting a decapitated fish of substantially circular cross-section, said fish having at least a back, a belly including belly flaps essentially defining a belly cavity, a backbone, lateral vertebral appendages projecting from said backbone, belly spokes, back spokes, and dorsal fins having fin holders, said apparatus including:
    (a) transfer means for moving said fish belly side down and head end leading along a processing pathway in a conveying direction with the fish engaged by its flanks;
    (b) means for opening said belly cavity and cutting free said belly spokes substantially up to said backbone by means of two belly filleting cuts;
    (c) means for cutting free said lateral vertebral appendages projecting from said backbone on the side remote from said belly substantially up to said backbone by means of two rib cuts;
    (d) means for severing a bone strip containing said lateral vertebral appendages by cutting through said bones on both sides of, and in the vicinity of, said backbone substantially as far as said rib cuts;
    (e) means for cutting free said back spokes to a point adjacent to said fin holders of said dorsal fin by means of two back filleting cuts from the belly side of said fish; and
    (f) means for separating the fillets from the bone structure by means of severing cuts from said back of said fish on both sides of said dorsal fins substantially as far as said back filleting cuts.

4. Apparatus as claimed in claim 3, wherein said decapitated fish also has pinbones, said apparatus further including pinbone cutting means for separating said fillets from said backbone together with said pinbones, said pinbone cutting means being arranged downstream of said means for cutting free said back spokes and upstream of said means for separating the fillets from the bone structure, when seen in the moving direction of said fish.

5. Apparatus for filleting a decapitated fish of substantially circular cross-section, said apparatus including conveyor means adapted to engage said fish by its flanks and to move said fish along a working pathway in a conveying direction and, arranged sequentially along said working pathway, a pair of belly filleting knives, a pair of rib knives, a pair of bone severing knives, a pair of back filleting knives, said back filleting knives being inclined to one another in wedge shape, and a pair of back severing knives, a series of guide elements situated above said working pathway, each of said guide elements having an underside and a groove formed in said underside, wherein at least one of said guide elements situated immediately upstream in said conveying direction of said back severing knives has at its upstream end a substantially roof-shaped recess formed in its undersurface contacting said fish, which recess communicates with said groove, the portion of greatest cross section of said recess being bounded by edges afforded by said guide element, each said edge having as its open end an overhanging rim which projects into said recess.

6. Apparatus as claimed in claim 5 wherein said groove in said at least one of said guide elements is defined by two substantially parallel side walls, said guide element further including two tongues extending in said conveying direction substantially coplanar with said side walls and thereby extending said groove, said tongues projecting from said guide element and extending to a point between said back severing knives and affording edges, said edges being adapted, in use, to contact the back of said fish with said dorsal fins located between said tongues, and extending substantially in colinear relationship with said edges bounding said recess in said at least one guide element.

7. Apparatus as claimed in claims 5 or 6, said apparatus comprising a pair of pinbone knives lying essentially in a common plane on both sides of said working pathway downstream of said back filleting knives and upstream of said back severing knives when seen in the moving direction of said fish, and further guide means lying in the vicinity of said pinbone knives and being provided with apertures to allow free access of the cutting edges of said pinbone cutting knives.

* * * * *